No. 832,128. PATENTED OCT. 2, 1906.
L. F. HERRICK.
HORN TRAINER.
APPLICATION FILED MAR. 27, 1906.

Witnesses:
C. H. Wesson
M. E. Regan

Inventor:
L. F. Herrick.
By Attorneys
Southgate & Southgate

UNITED STATES PATENT OFFICE.

LEANDER F. HERRICK, OF WORCESTER, MASSACHUSETTS.

HORN-TRAINER.

No. 832,128.     Specification of Letters Patent.     Patented Oct. 2, 1906.

Application filed March 27, 1906. Serial No. 308,266.

*To all whom it may concern:*

Be it known that I, LEANDER F. HERRICK, a citizen of the United States, residing at Worcester, in the county of Worcester and State of Massachusetts, have invented a new and useful Horn-Trainer, of which the following is a specification.

My invention relates to a device for training the horns of young animals. The principal use of devices of this character is to correct a tendency to a growth of misshapen horns during the early period of their growth; and the chief objects of my invention are to provide means for holding a horn-trainer securely on the head of an animal and to provide for securing the parts in adjusted positions to permit their application to animals of varying sizes.

Reference is to be had to the accompanying drawings, in which—

Figure 1:
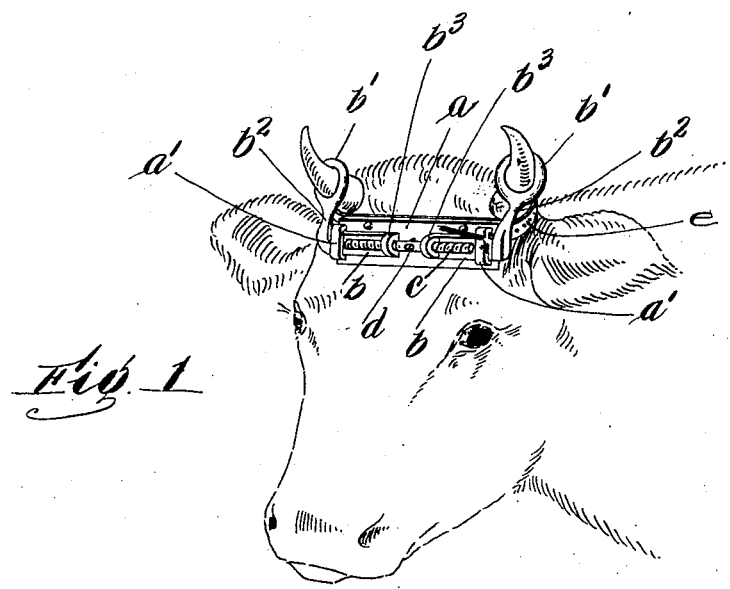
Figure 2:
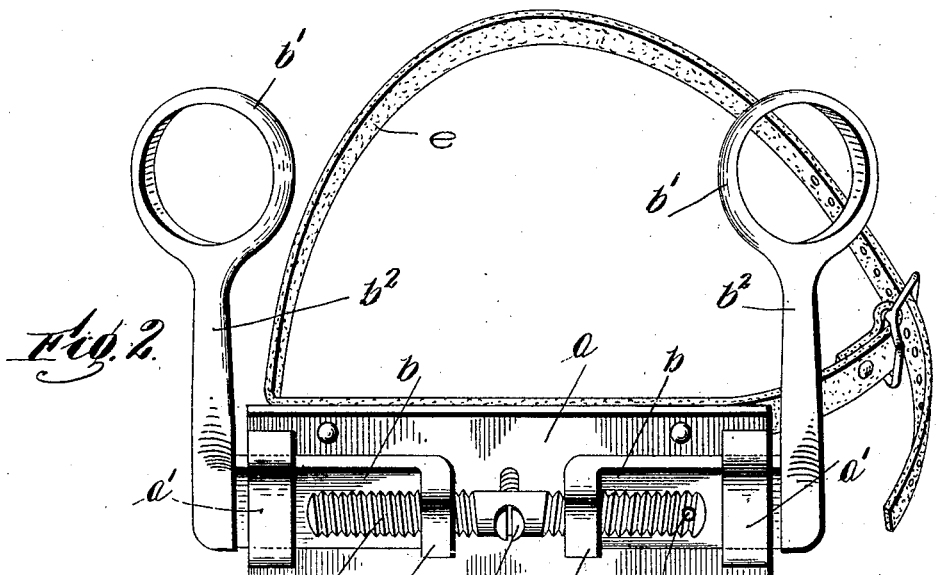

Figure 1 is an illustration of a head of a young animal with a device embodying the principles of my invention applied thereto, and Fig. 2 is a front elevation of the horn-training device removed from the head of the animal.

The device, as shown, comprises a main plate $a$, having a pair of guides $a'$, through which pass slides $b'$. Each of these slides is provided with horn-engaging means, shown in the form of an eye $b'$. This eye is mounted on an arm $b^2$, which extends upwardly and to the rear of the plate, the eye being located at an angle with respect to the plate, so that the horns when their growth commences can be introduced into the eye and any growth in the wrong direction restrained.

In order to adjust the eyes with respect to the plate, the slides are provided with lugs $b^3$, having screw-threaded openings through which passes a right and left hand screw $c$. This screw is provided with a perforation $c'$, through which a nail or other similar object can be inserted for the purpose of turning the screw, and it is also provided with a perforation through which a fastening device (shown in the form of a screw $d$) can be passed. The screw passes into a screw-threaded opening in the plate and is intended to hold the adjusting means in any adjusted or stationary position.

For the purpose of securing the plate to the head of an animal a flexible connection is mounted thereon. This is shown in the present instance in the form of a rawhide strap $e$, riveted to the upper part of the back of the plate and adapted to pass around the head of the animal and the base of the horns, as is clearly indicated in Fig. 1.

The device is preferably applied to cattle between the ages of ten and eighteen months, and being secured firmly in position by means of the strap the eyes are adjusted on the plate to the proper distance apart to engage the horns and keep them from growing out of the proper direction, thereby securing symmetry in growth.

While I have illustrated a particular form in which my invention may be embodied, I am aware that many changes may be made therein without departing from the scope of my invention as expressed in the claims.

Having thus fully described my invention, what I claim, and desire to secure by Letters Patent, is—

1. A horn-trainer comprising a plate, horn-engaging means adjustably mounted thereon, and a flexible connection secured to the back of the plate and adapted to be passed around the base of the horns to hold the trainer in place.

2. A horn-trainer comprising a pair of adjustable horn-engaging eyes, and a rawhide strap for securing the eyes to the head of the animal.

3. A horn-trainer comprising a plate, means for engaging a horn adjustably mounted on said plate, a screw for adjusting the position of said means, means for fixing the screw in adjustable positions, and a strap secured to the back of the plate and adapted to be passed around the base of the horns for securing the plate in position on the head of an animal.

4. A horn-training device, comprising horn-engaging means, a longitudinally-movable screw for adjusting the position of said means, and means for fixing the screw in adjusted positions and preventing it from turning.

5. A horn-trainer comprising a pair of horn-engaging eyes, a plate on which said eyes are mounted, means for adjusting the eyes toward and from each other, and a fastening device adapted to engage the plate to secure the adjusting means in stationary position.

In testimony whereof I have hereunto set my hand in the presence of two subscribing witnesses.

LEANDER F. HERRICK.

Witnesses:
    ALBERT E. FAY,
    LOUIS W. SOUTHGATE.